US005629399A

United States Patent [19]
Juen et al.

[11] Patent Number: 5,629,399
[45] Date of Patent: May 13, 1997

[54] FAST CURING ORGANOSILOXANE COMPOSITIONS WITH LONG WORKING TIMES

[75] Inventors: Donnie R. Juen, Sanford; Kent R. Larson, Midland; Myron T. Maxson, Sanford; Lawrence J. Rapson, Bay City, all of Mich.

[73] Assignee: Dow Corning Corporation, Midland, Mich.

[21] Appl. No.: 610,944

[22] Filed: Mar. 5, 1996

[51] Int. Cl.⁶ .................................................. C08G 77/08
[52] U.S. Cl. ...................... 528/15; 528/18; 528/20
[58] Field of Search ...................... 528/15, 18, 20

[56] References Cited

U.S. PATENT DOCUMENTS

| 4,595,739 | 6/1986 | Cavezzan | 528/15 |
| 4,603,168 | 7/1986 | Sasaki et al. | 522/18 |
| 5,082,894 | 1/1992 | VanWert et al. | 524/730 |
| 5,270,425 | 12/1993 | Vanwert et al. | 528/15 |

*Primary Examiner*—Melvyn I. Marquis
*Attorney, Agent, or Firm*—Robert L. McKellar

[57] ABSTRACT

A room temperature curable organosiloxane composition, containing an alkenyl-containing polyorganosiloxane, an organohydrogensiloxane, a platinum catalyst, a methylvinylcyclosiloxane and an acetylenic alcohol, which exhibits a long working time and a fast cure time.

11 Claims, No Drawings

5,629,399

FAST CURING ORGANOSILOXANE COMPOSITIONS WITH LONG WORKING TIMES

BACKGROUND OF THE INVENTION

1. Field of the Invention

This invention relates to organosiloxane compositions that cure via a platinum catalyzed hydrosilylation reaction. More particularly, this invention relates to combinations of additives for organosiloxane compositions that impart both long working times and short cure times at room temperature.

2. Description of the Related Art

In U.S. Pat. No. 4,595,739, issued on Jun. 17, 1986, Cavezzan teaches an antistick coating composition comprising a vinyl-containing organopolysiloxane, an organohydrogensiloxane, a catalyst, and a ketone compound.

In U.S. Pat. No. 4,603,168, issued on Jul. 29, 1986, Sasaki et al. teach a heat and UV curable composition consisting essentially of an alkenyl-containing organosiloxane; an organohydrogensiloxane; a catalyst; a photosensitizer; and an addition-reaction retarder selected from alkynol, 3-methyl-3-pentene-1-yne, 3,5-dimethyl-3-hexene-1-yne, methylvinylsiloxane cyclics, and benzotriazole.

In U.S. Pat. No. 5,082,894, issued on Jan. 21, 1992, Vanwert et al. teach a one part organosiloxane composition comprising an alkenyl-containing organosiloxane, an organohydrogensiloxane, a catalyst, acetylenic alcohol as a catalyst inhibitor, and a functionally-substituted silane adhesion promoter.

In U.S. Pat. No. 5,270,425, issued on Dec. 14, 1993, Vanwert et at. teach a one part organosiloxane composition comprising an alkenyl-containing organosiloxane; an organohydrogensiloxane; a catalyst; an adhesion promoter; and an inhibitor which includes an acetylenic alcohol and a cyclic methylvinylsiloxane. This composition exhibits long term storage stability under ambient conditions and adhesion at curing temperatures below 120° C.

SUMMARY OF THE INVENTION

The present inventors discovered that the working time and demold time of organosiloxane compositions can be optimized by using specific combinations of platinum catalyst inhibitors.

DETAILED DESCRIPTION OF THE INVENTION

This invention provides organosiloxane compositions which exhibit long working times and short demold times at moderate temperatures, said composition comprising (A) a curable polyorganosiloxane containing at least two alkenyl radicals per molecule;

(B) an amount sufficient to cure said composition of an organohydrogensiloxane containing at least two silicon-bonded hydrogen atoms per molecule, wherein the sum of the alkenyl radical per molecule of (A) and the silicon-bonded hydrogen atoms per molecule of (B) is greater than 4;

(C) an amount sufficient to promote curing of said composition of a platinum catalyst;

(D) 0.03 to 0.6 weight percent, based on the combined weights of components (A) and (B), of a methylvinylcyclosiloxane; and (E) 0.002 to 0.03 weight percent, based on the combined weights of components (A) and (B) of an acetylenic alcohol; wherein the amounts of components (D) and (E) are selected such that the resulting composition exhibits a working time of at least 15 minutes at 95° F. and a demold time of less than 5.5 hours at 75° F.

This invention also provides organosiloxane compositions which exhibit long working times and short demold times at moderate temperatures, said composition comprising (I) a base portion, comprising:
  (A) a curable polyorganosiloxane containing at least two alkenyl radicals per molecule; and
  (C) an amount sufficient to promote curing of said composition of a platinum catalyst; and (II) a curing agent portion, comprising:
  (B) an amount sufficient to cure said composition of an organohydrogensiloxane containing at least two silicon-bonded hydrogen atoms per molecule, where the sum of the alkenyl radical per molecule of (A) and the silicon-bonded hydrogen atoms per molecular of (B) is greater than 4;
  (D) 0.03 to 0.6 weight percent, based on the combined weights of components (A) and (B), of a methylvinylcyclosiloxane; and
  (E) 0.002 to 0.03 weight percent, based on the combined weights of components (A) and (B) of an acetylenic alcohol;

wherein the composition that results when the base portion and the curing portion are mixed is room temperature curable and wherein the amounts of components (D) and (E) are selected such that the composition that results when the base portion and the curing agent portion are mixed has a working time of at least 15 minutes and a demold time of less than 5.5 hours.

The Alkenyl-Containing Polyorganosiloxane (Ingredient A)

The polyorganosiloxane referred to as ingredient A is the principal ingredient of the compositions of the present invention. This ingredient must contain at least two silicon-bonded alkenyl radicals in each molecule. Suitable alkenyl radicals contain from 1 to about 10 carbon atoms and are exemplified by, but not limited to, vinyl, allyl and 5-hexenyl. The silicon-bonded organic groups other than alkenyl radicals present in ingredient A are typically substituted and unsubstituted monovalent hydrocarbon radicals. Unsubstituted monovalent hydrocarbon radicals are exemplified by, but not limited to, alkyl radicals such as methyl, ethyl and propyl, and aryl radicals such as phenyl. The substituted monovalent hydrocarbon radicals include, but are not limited to, halogenated hydrocarbon radicals. Halogenated hydrocarbon radicals are exemplified by halogenated alkyl radicals such as 3,3,3-trifluoropropyl.

The molecular structure of this polyorganosiloxane can be straight chain, branched chain, cyclic or network and the degree of polymerization is not restricted. Preferred embodiments of ingredient A are represented by the general formula

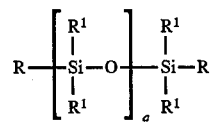

where R is an alkenyl radical and $R^1$ is individually selected from substituted and unsubstituted monovalent radicals. When a is less than or equal to 5, the polyorganosiloxane tends to readily evaporate. R is preferably a vinyl radical.

The two $R^1$ radicals on each silicon atom can be identical or different, and can contain from 1 to about 20 carbon atoms. A range of 1 to 10 carbon atoms is preferred based on the availability of the corresponding monomers. Most preferably at least one of the hydrocarbon radicals on each silicon atom is methyl and any remainder are vinyl, phenyl and/or 3,3,3-trifluoropropyl.

Embodiments of ingredient A that contain ethylenically unsaturated hydrocarbon radicals only at the terminal positions include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated dimethylsiloxane/3,3,3-trifluoropropylmethylsiloxane copolymers and dimethylvinylsiloxy-terminated-dimethylsiloxane/methylphenylsiloxane copolymers.

Methods of preparing ingredient A of the present composition by hydrolysis and condensation of the corresponding halosilanes or by condensation of the cyclic polydiorganosiloxanes are sufficiently disclosed in patents and other literature such that a detailed description in this specification is not deemed necessary.

The Organohydrogensiloxane (Ingredient B)

The curable organosiloxane compositions of the present invention contain at least one organohydrogensiloxane. This ingredient is referred to as ingredient B and functions as a crosslinker for ingredient A. In the presence of a hydrosilylation catalyst, the silicon-bonded hydrogen atoms in ingredient B undergo an addition reaction, which is referred to as hydrosilylation, with the silicon-bonded alkenyl groups in ingredient A, resulting in crosslinking and curing the composition.

Ingredient B must contain at least two silicon-bonded hydrogen atoms in each molecule. If ingredient A contains an average of only two alkenyl radicals per molecule, ingredient B must contain an average of more than two silicon-bonded hydrogen atoms to achieve a crosslinked structure in the final cured product. The silicon-bonded organic groups present in ingredient B are selected from the same group of substituted and unsubstituted monovalent hydrocarbon radicals as the organic groups of ingredient A, with the proviso that the organic groups in ingredient B must be substantially free of ethylenic or acetylenic unsaturation. The molecular structure of ingredient B can be straight chain, branched-containing straight chain, cyclic or network.

While the molecular weight of ingredient B is not specifically restricted, viscosities in the range of 3 to 10,000 centipoise, at 25° C., are preferred. The concentration of ingredient B must be sufficient to provide a molar ratio of silicon-bonded hydrogen atoms to alkenyl radicals in the composition of from 1 to 20. A range of from 1 to 3, inclusive is preferred. When the composition contains less than 1 mole of silicon-bonded hydrogen atoms per mole of alkenyl radicals, the composition cannot be satisfactorily cured to an elastomer. Bubble formation resulting from the generation of hydrogen gas can occur when the composition contains more than about 20 silicon-bonded hydrogen atoms per alkenyl radical.

The Platinum-Containing Hydrosilylation Reaction Catalyst (Ingredient C)

The platinum catalysts that may be used as ingredient C in the compositions of the present invention are any of the known forms that are effective in promoting the reaction of SiH groups with silicon-bonded alkenyl groups. Suitable forms of platinum include but are not limited to chloroplatinic acid, platinum compounds and complexes of platinum compounds with unsaturated organic compounds or with siloxanes having silicon-bonded groups containing ethylenically unsaturated groups. Additional examples of suitable platinum catalysts include complexes of platinous halides or chloroplatinic acid with divinyldisiloxane and complexes formed by the reaction of chloroplatinic acid, divinyltetramethyldisiloxane and tetramethyldisiloxane. Suitable platinum catalysts are described in U.S. Pat. No. 3,419,593, which issued on Dec. 31, 1968, which is incorporated herein by reference for what it teaches about the preparation of such catalysts.

The amount of platinum catalyst is generally the amount that provides from 5 to 250 parts by weight of platinum metal per million parts of the combined weights of ingredients A and B. In preferred embodiments of the present invention, the composition contains from 10 to 57 parts by weight of platinum metal per million parts of the combined weights of ingredients A and B. In more preferred embodiments, the composition contains from 21 to 50 ppm. In most preferred embodiments, the composition contains from 35 to 45 ppm.

Methylvinylcyclosiloxane (Ingredient D)

Ingredient D is a cyclic methylvinylsiloxane oligomer. The amount of ingredient D used in the compositions of the present invention effects the working time and the demold time of the resulting compositions. The amount of ingredient D is selected such that the resulting composition has a working time, at 95° F., of greater than or equal to 15 minutes, and a demold time, at 75° F., of less than or equal to 5.5 hours. Working time is defined as the number of minutes between the time when the ingredients of the combination are mixed together and the time when the combination is no longer self-leveling. The compositions of the present invention generally are no longer self-leveling when they attain a mixed viscosity that is greater than or equal to 1700 poise, at 25° C. Demold time is defined as time between when the composition is mixed and poured into a mold and the time when the resulting elastomer can be pulled from the mold without permanently deforming the elastomer. Generally compositions of the present invention can be removed from a mold without being permanently deformed, after they have cured to the extent that they have a Shore A durometer of 5 to 10 points as measured according to ASTM D 2240. The amount of ingredient D needed to achieve a working time of less than or equal to 15 minutes, at 95° F. and a demold time of less than or equal to 5.5 hours, at 75° F., varies depending upon the acetylenic alcohol used as ingredient E, the amount of ingredient E used in the composition, the polysiloxane used as ingredient A, the organohydrogensiloxane used as ingredient B, and the amount and type of platinum catalyst used as ingredient C. With the teachings of the present specification, a person of ordinary skill in the art could determine the appropriate amount of ingredient E to use without undue experimentation. In compositions of the present invention, ingredient D is generally present in an amount ranging from 0.03 to 0.6 weight percent, based on the combined weights of ingredients (A) and (B). In preferred embodiments, the amount of ingredient D ranges from 0.06 to 0.3 weight percent. In more preferred embodiments, the amount of ingredient D ranges from 0.1 to 0.25 weight percent. The use of cyclic methylvinylsiloxane and other olefinic substituted organosiloxanes as platinum catalyst inhibitors is described in U.S. Pat. No. 3,989,667, the relevant sections of which are herein incorporated by reference. The most preferred cyclic methylvinylsiloxane is tetramethyltetravinylcyclotetrasiloxane.

Acetylenic Alcohol (Ingredient E)

Ingredient E is an acetylenic alcohol. The amount of ingredient E that is used in the composition of the present invention effects the working time and the demold time of the resulting composition. The amount of ingredient E is selected such that the resulting composition has a working time, at 95° F., of greater than or equal to 15 minutes, and a demold time, at 75° F., of less than or equal to 5.5 hours. The amount of ingredient E needed to achieve a working time of less than or equal to 15 minutes, at 95° F. and a demold time of less than or equal to 5.5 hours, at 75° F. varies depending upon the acetylenic alcohol used as ingredient E, the amount of cyclic methylvinylsiloxane used as ingredient D, the polysiloxane used as ingredient A, the organohydrogensiloxane used as ingredient B, and the type and amount of platinum catalyst used as ingredient C. With the teachings of the present specification, a person of ordinary skill in the art could determine the appropriate amount of ingredient E to use without undue experimentation. In compositions of the present invention, ingredient E is generally present in an amount ranging from 0.002 to 0.030 weight percent, based on the combined weights of ingredients (A) and (B). In preferred embodiments, the amount of ingredient E ranges from 0.004 to 0.025 weight percent. In more preferred embodiments, the amount of ingredient E ranges from 0.006 to 0.11 weight percent.

The acetylenic alcohol of the present invention may be primary, secondary or tertiary. In preferred embodiments of the present invention, ingredient E is a liquid at 25° C. The carbon-carbon triple bond that characterizes this ingredient is preferably located at a terminal carbon atom. Based on commercial availability, ingredient E is preferably 3,5-dimethyl-1-hexyne-3-ol, methyl butynol or 1-ethynylcyclohexanol. Most preferred is 3,5-dimethyl-1-hexyne-3-ol.

Optional Ingredients

The organosiloxane compositions of the present invention may also contain one or more additives that are conventionally used in curable compositions of this type to impart or enhance certain physical properties of the cured composition or to facilitate processing of the curable composition. Typical additives include but are not limited to reinforcing fillers, such as finely divided silica; non-reinforcing fillers, such as quartz, alumina, mica and calcium carbonate; pigments, such as carbon black and titanium dioxide; dyes; flame retardants; diluents, such as trimethylsiloxy terminated polydimethylsiloxane and organic solvents; and heat and/or ultraviolet light stabilizers.

Preparation of the Compositions of the Present Invention

The compositions of this invention can be prepared by combining all the ingredients at ambient temperatures.

In the alternative, the composition of this invention can be prepared by first preparing a base portion and a curing agent portion, and then mixing the base portion and curing agent portion at ambient temperatures. The base portion contains the alkenyl-containing polyorganosiloxane and the platinum catalyst. The base portion may optionally contain one or more additives. The curing agent portion contains the organohydrogensiloxane, the acetylenic alcohol, and the methylvinylcyclosiloxane. The curing agent portion may optionally contain a portion of the alkenyl-containing polyorganosiloxane and one or more additives.

In another alternative, the composition of this invention can be prepared by first preparing a catalyst-containing portion and a crosslinking-agent-containing portion, and then mixing the catalyst-containing portion and the crosslinking-agent-containing portion at ambient temperatures. The catalyst-containing portion contains the platinum catalyst. The catalyst-containing portion may optionally contain a portion of the alkenyl-containing polyorganosiloxane and one or more additives. The crosslinking-agent-containing portion contains the organohydrogensiloxane, the acetylenic alcohol, and the methylvinylcyclosiloxane. The a crosslinking-agent-containing portion may also contain a portion of the alkenyl-containing polyorganosiloxane and one or more additives.

The compositions of the present invention are curable at room temperature.

EXAMPLES

The following examples demonstrate the unique combination of long working time and fast cure that can be obtained by using compositions of the present invention. The examples should not be interpreted as limiting the scope of the invention as defined in the accompanying claims. Unless otherwise specified, all parts and percentages are by weight and all viscosity's were measured at 25° C.

The room temperature curable organosiloxanes compositions of Examples 1–3 and the Comparative Examples were prepared according to the following method. A base portion for each of the Examples and the Comparative Examples was prepared by mixing the ingredients of the base portion. A curing agent portion for each of the Examples and the Comparative Examples was prepared by mixing the ingredients of the curing agent portion. The base portion and the curing agent portion were then mixed at a 10:1 mix ratio. The amount of cyclic methylvinylsiloxane (ingredient D) and acetylenic alcohol (ingredient E) was varied in each the Examples. These amounts are reported in Table I as a weight percentage, based on the combined weights of the alkenyl-containing polyorganosiloxane and the organohydrogensiloxane.

The working time of each the Examples and the Comparative Examples was measured and reported on Table I. The working time was measured from the time the material was mixed until the time the material was no longer self leveling. The demold time of each of the Examples and the Comparative Examples was measured and reported on Table I. The demold time was measured from the time the material was mixed until the time the material attained a Shore A durometer of at least 5.

Example 1

Base Portion 59.7 parts by weight of dimethylvinylsiloxy-terminated dimethylsiloxane with 27% by weight of silica, having a viscosity of approximately 48,000 centipoise 36.5 parts by weight of five micron silica 3.82 parts by weight of dimethylvinylsiloxy-terminated dimethylsiloxane, having a viscosity of approximately 55,000 centipoise 0.6 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Curing Agent Portion 6.45 parts by weight of dimethylvinylsiloxy-terminated dimethylsiloxane with 27% by weight of silica, having a viscosity of approximately 48,000 centipoise 5.50 parts by weight of dimethylvinylsiloxy-terminated dimethylsiloxane, having a viscosity of approximately 450 centipoise 5.78 parts by weight of a trimethylsiloxy-terminated polyorganosiloxane containing an average of five methylhydrogensiloxane units and three dimethylsiloxane units per molecule with a silicon-bonded hydrogen atom content of 0.8 weight percent 0.312 parts by weight of tetramethyltetravinylcyclotetrasiloxane 0.011 parts by weight of 3,5-dimethyl-1-hexyn-3-ol 0.28 parts by weight of Pigment Blue 15 diluted with 60% by weight of a trimethylsiloxy-terminated dimethylsiloxane

Example 2

Base Portion 59.7 parts by weight of dimethylvinylsiloxy-terminated dimethylsiloxane with 27% by weight of silica, having a viscosity of approximately 48,000 centipoise 36.5 parts by weight of five micron silica 3.82 parts by weight of dimethylvinylsiloxy-terminated dimethylsiloxane, having a viscosity of approximately 55,000 centipoise 0.6 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Curing Agent Portion 6.49 parts by weight of dimethylvinylsiloxy-terminated dimethylsiloxane with 27% by weight of silica, having a viscosity of approximately 48,000 centipoise 5.50 parts by weight of dimethylvinylsiloxy-terminated dimethylsiloxane, having a viscosity of approximately 450 centipoise 5.78 parts by weight of a trimethylsiloxy-terminated polyorganosiloxane containing an average of five methylhydrogensiloxane units and three dimethylsiloxane units per molecule with a silicon -bonded hydrogen atom content of 0.8 weight percent 0.275 parts by weight of tetramethyltetravinylcyclotetrasiloxane 0.011 parts by weight of 3,5-dimethyl-1-hexyn-3-ol 0.28 parts by weight of Pigment Blue 15 diluted with 60% by weight of a trimethylsiloxy-terminated dimethylsiloxane

Example 3

Base Portion 59.7 parts by weight of dimethylvinylsiloxy-terminated dimethylsiloxane with 27% by weight of silica, having a viscosity of approximately 48,000 centipoise 36.5 parts by weight of five micron silica 3.82 parts by weight of dimethylvinylsiloxy-terminated dimethylsiloxane, having a viscosity of approximately 55,000 centipoise 0.6 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Curing Agent Portion 5.52 parts by weight of dimethylvinylsiloxy-terminated dimethylsiloxane with 27% by weight of silica, having a viscosity of approximately 48,000 centipoise 4.71 parts by weight of dimethylvinylsiloxy-terminated dimethylsiloxane, having a viscosity of approximately 450 centipoise 4.95 parts by weight of a trimethylsiloxy-terminated polyorganosiloxane containing an average of five methylhydrogensiloxane units and three dimethylsiloxane units per molecule with a silicon-bonded hydrogen atom content of 0.8 weight percent 0.181 parts by weight of tetramethyltetravinylcyclotetrasiloxane 0.011 parts by weight of 3,5-dimethyl-1-hexyn-3-ol 0.28 parts by weight of Pigment Blue 15 diluted with 60% by weight of a trimethylsiloxy-terminated dimethylsiloxane

Comparative Example 1

Base Portion 59.7 parts by weight of dimethylvinylsiloxy-terminated dimethylsiloxane with 27% by weight of silica, having a viscosity of approximately 48,000 centipoise 36.5 parts by weight of five micron silica 3.82 parts by weight of dimethylvinylsiloxy-terminated dimethylsiloxane, having a viscosity of approximately 55,000 centipoise 0.6 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Curing Agent Portion 3.62 parts by weight of dimethylvinylsiloxy-terminated dimethylsiloxane with 27% by weight of silica, having a viscosity of approximately 48,000 centipoise 2.95 parts by weight of dimethylvinylsiloxy-terminated dimethylsiloxane, having a viscosity of approximately 450 centipoise 3.04 parts by weight of a trimethylsiloxy-terminated polyorganosiloxane containing an average of five methylhydrogensiloxane units and three dimethylsiloxane units per molecule with a silicon-bonded hydrogen atom content of 0.8 weight percent 0.10 parts by weight of tetramethyltetravinylcyclotetrasiloxane 0.007 parts by weight of 3,5-dimethyl-1-hexyn-3-ol 0.28 parts by weight of Pigment Blue 15 diluted with 60% by weight of a trimethylsiloxy-terminated dimethylsiloxane

Comparative Example 2

Base Portion 59.7 parts by weight of dimethylvinylsiloxy-terminated dimethylsiloxane with 27% by weight of silica, having a viscosity of approximately 48,000 centipoise 36.5 parts by weight of five micron silica 3.82 parts by weight of dimethylvinylsiloxy-terminated dimethylsiloxane, having a viscosity of approximately 55,000 centipoise 0.6 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Curing Agent Portion 3.40 parts by weight of dimethylvinylsiloxy-terminated dimethylsiloxane with 27% by weight of silica, having a viscosity of approximately 48,000 centipoise 3.00 parts by weight of dimethylvinylsiloxy-terminated dimethylsiloxane, having a viscosity of approximately 450 centipoise 3.15 parts by weight of a trimethylsiloxy-terminated polyorganosiloxane containing an average of five methylhydrogensiloxane units and three dimethylsiloxane units per molecule with a silicon-bonded hydrogen atom content of 0.8 weight percent 0.151 parts by weight of tetramethyltetravinylcyclotetrasiloxane 0.0085 parts by weight of 3,5-dimethyl-1-hexyn-3-ol 0.30 parts by weight of Pigment Blue 15 diluted with 60% by weight of a trimethylsiloxy-terminated dimethylsiloxane Comparative Example 3

Base Portion 59.7 parts by weight of dimethylvinylsiloxy-terminated dimethylsiloxane with 27% by weight of silica, having a viscosity of approximately 48,000 centipoise 36.5 parts by weight of five micron silica 3.82 parts by weight of dimethylvinylsiloxy-terminated dimethylsiloxane, having a viscosity of approximately 55,000 centipoise 0.6 parts by weight of the reaction product of hexachloroplatinic acid and symtetramethyldivinyldisiloxane that has been diluted with a liquid dimethylvinylsiloxy-terminated polydimethylsiloxane in an amount sufficient to achieve a platinum content of 0.6 weight percent Curing Agent Portion 3.67 parts by weight of dimethylvinylsiloxy-terminated dimethylsiloxane with 27% by weight of silica, having a viscosity of approximately 48,000 centipoise 3.10 parts by weight of dimethylvinylsiloxy-terminated dimethylsiloxane, having a viscosity of approximately 450 centipoise 3.00 parts by weight of a trimethylsiloxy-terminated polyorganosiloxane containing an average of five methylhydrogensiloxane units and three dimethylsiloxane units per molecule with a silicon-bonded hydrogen atom content of 0.8 weight percent 0.102 parts by weight of tetramethyltetravinylcyclotetrasiloxane 0.0134 parts by weight of 3,5-dimethyl-1-hexyn-3-ol 0.11 parts by weight of Pigment Blue 15 diluted with 60% by weight of a trimethylsiloxy-terminated dimethylsiloxane silicon-bonded hydrogen atoms per molecule, wherein the sum of the alkenyl radical per molecule of (A) and the silicon-bonded hydrogen atoms per molecule of (B) is greater than 4;

(C) an amount sufficient to promote curing of said composition of a platinum catalyst;

(D) 0.03 to 0.6 weight percent, based on the combined weights of components (A) and (B), of a methylvinylcyclosiloxane; and (E) 0.002 to 0.03 weight percent, based on the combined weights of components (A) and (B) of an acetylenic alcohol;

wherein the amounts of components (D) and (E) are selected such that the resulting composition has a working time of at least 15 minutes and a demold time of less than 5.5 hours.

2. An organosiloxane composition, comprising:
  (I) a base portion, comprising:
    (A) a curable polyorganosiloxane containing at least two alkenyl radicals per molecule; and
    (C) an amount sufficient to promote curing of said composition of a platinum catalyst; and
  (II) a curing agent portion, comprising:
    (B) an amount sufficient to cure said composition of an organohydrogensiloxane containing at least two silicon-bonded hydrogen atoms per molecule, where the sum of the alkenyl radical per molecule of (A) and the silicon-bonded hydrogen atoms per molecular of (B) is greater than 4;
    (D) 0.03 to 0.6 weight percent, based on the combined weights of components (A) and (B), of a methylvinylcyclosiloxane; and
    (E) 0.002 to 0.03 weight percent, based on the combined weights of components (A) and (B) of an acetylenic alcohol;

wherein the composition that results when the base portion and the curing agent portion are mixed is room temperature curable and wherein the amounts of components (D) and (E) are selected such that the composition that results when the base portion and the curing agent portion are mixed has a working time of at least 15 minutes and a demold time of less than 5.5 hours.

3. An organosiloxane composition, comprising:
  (i) a catalyst-containing portion, comprising:
    (A) a curable polyorganosiloxane containing at least two alkenyl radicals per molecule; and

TABLE 1

|  | Example 1 | Example 2 | Example 3 | Comparative Example 1 | Comparative Example 2 | Comparative Example 3 |
|---|---|---|---|---|---|---|
| Wt % MeVi Cyclics | 0.221 | 0.195 | 0.150 | 0.130 | 0.196 | 0.133 |
| Wt % Acetylenic Alcohol | 0.0078 | 0.0078 | 0.0091 | 0.0091 | 0.0110 | 0.0170 |
| Working Time @ 95 F., minutes | 21 | 20 | 16 | 14 | 33 | 22 |
| Demold Time @ 75 F., hours | 5.00 | 4.15 | 3.25 | 3.25 | 6.16 | 7.15 |

That which is claimed:

1. A room temperature curable organosiloxane composition, comprising:
  (A) a curable polyorganosiloxane containing at least two alkenyl radicals per molecule;
  (B) an amount sufficient to cure said composition of an organohydrogensiloxane containing at least two (C) an amount sufficient to promote curing of said composition of a platinum catalyst; and
  (ii) a crosslinking-agent-containing portion, comprising:
    (B) an amount sufficient to cure said composition of an organohydrogensiloxane containing at least two silicon-bonded hydrogen atoms per molecule, where the sum of the alkenyl radical per molecule of (A)

and the silicon-bonded hydrogen atoms per molecular of (B) is greater than 4;

(D) 0.03 to 0.6 weight percent, based on the combined weights of components (A) and (B), of a methylvinylcyclosiloxane;

(E) 0.002 to 0.03 weight percent, based on the combined weights of components (A) and (B) of an acetylenic alcohol; and wherein the composition that results when the catalyst-containing portion and the crosslinking-agent-containing portion are mixed is room temperature curable and wherein the amounts of components (D) and (E) are selected such that the composition that results when the catalyst-containing portion and the crosslinking-agent-containing portion are mixed has a working time of at least 15 minutes and a demold time of less than 5.5 hours.

4. An organosiloxane composition, comprising:

(i) a catalyst-containing portion, comprising:

(C) an amount sufficient to promote curing of said composition of a platinum catalyst; and (ii) a crosslinking-agent-containing portion, comprising:

(A) a curable polyorganosiloxane containing at least two alkenyl radicals per molecule;

(B) an amount sufficient to cure said composition of an organohydrogensiloxane containing at least two silicon-bonded hydrogen atoms per molecule, where the sum of the alkenyl radical per molecule of (A) and the silicon-bonded hydrogen atoms per molecular of (B) is greater than 4;

(D) 0.03 to 0.6 weight percent, based on the combined weights of components (A) and (B), of a methylvinylcyclosiloxane; and (E) 0.002 to 0.03 weight percent, based on the combined weights of components (A) and (B) of an acetylenic alcohol;

wherein the composition that results when the catalyst-containing portion and the crosslinking-agent-containing portion are mixed is room temperature curable and wherein the amounts of components (D) and (E) are selected such that the composition that results when the catalyst-containing portion and the crosslinking-agent-containing portion are mixed has a working time of at least 15 minutes and a demold time of less than 5.5 hours.

5. The composition according to claim 1, wherein component (D) is present in an amount ranging from 0.06 to 0.3 weight percent, and component (E) is present in an amount ranging from 0.004 to 0.025 weight percent.

6. The composition according to claim 5, wherein component (D) is present in an amount ranging from 0.1 to 0.25 weight percent, and component (E) is present in an amount ranging from 0.006 to 0.011 weight percent.

7. The composition according to claim 5, wherein (C) is present in an amount that provides 21 to 50 ppm of platinum metal.

8. The composition according to claim 6, wherein component (C) is present in an amount that provides 35 to 45 ppm of platinum metal.

9. The composition according to claim 1, where component (D) is tetramethyltetravinylcyclotetrasiloxane.

10. The composition according to claim 1, where component (E) is 3,5-dimethyl-1-hexyne-3-ol.

11. The composition according to claim 8, wherein component (E) is 3,5-dimethyl-1-hexyne-3-ol, and component (D) is tetramethyltetravinylcyclotetrasiloxane.

* * * * *